UNITED STATES PATENT OFFICE.

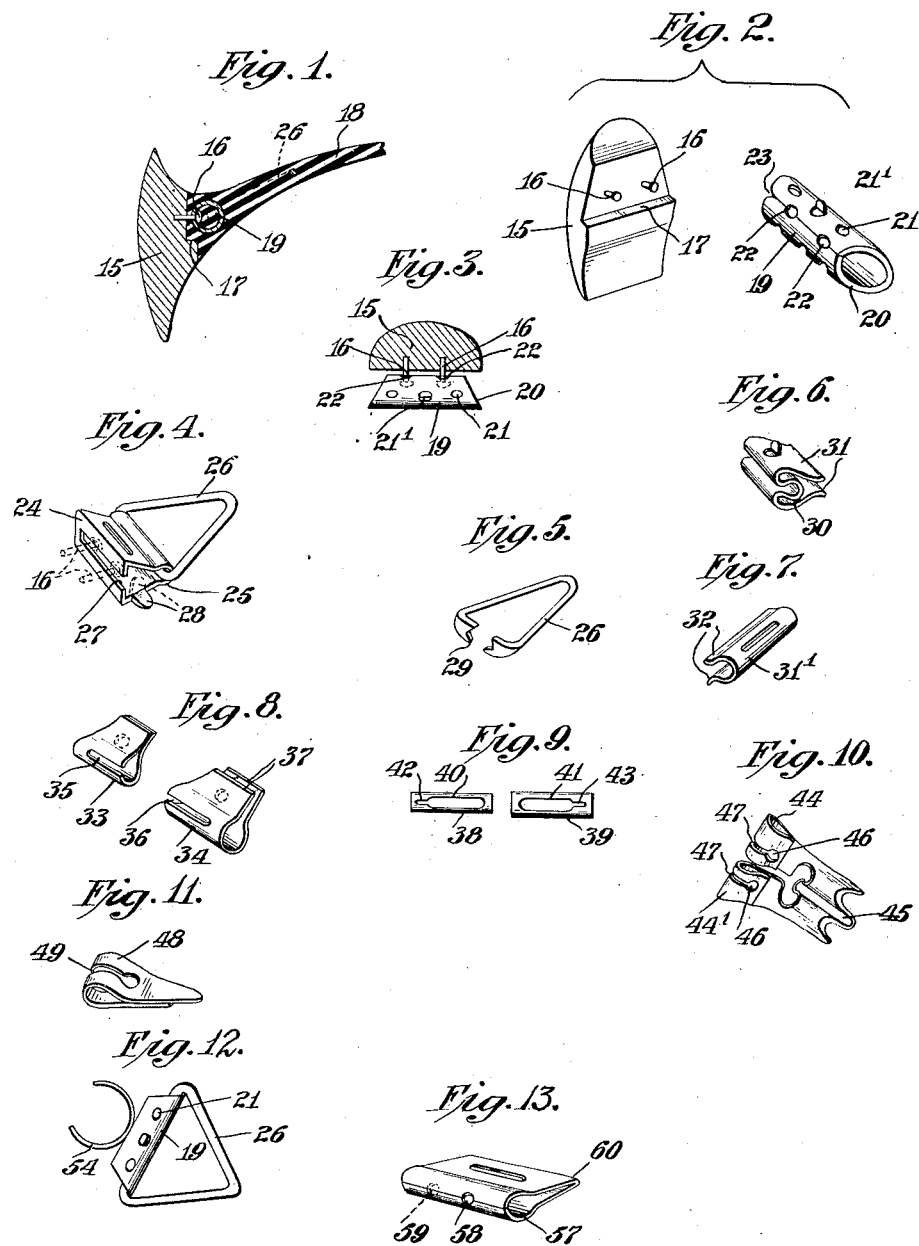

RALPH V. BLAKE, OF YONKERS, NEW YORK.

ARTIFICIAL DENTURE.

1,369,078. Specification of Letters Patent. Patented Feb. 22, 1921.

Application filed December 6, 1920. Serial No. 428,552.

*To all whom it may concern:*

Be it known that I, RALPH V. BLAKE, a citizen of the United States of America, residing at Yonkers, New York, have invented a new and useful Artificial Denture, of which the following is a specification.

My invention relates particularly to means for securing artificial teeth to composition plates.

It has been customary to secure the teeth to the plate by means of pins which project from the teeth and whose heads are embedded in the rubber or other composition in the molding operation. In many cases this attachment is so weak that the teeth easily break off.

The main object of my invention is to provide a simple means for improving the anchorage or connection between the teeth and the plate. I have also sought to devise a construction which can be used without any change in the technique of manufacture.

Another object is to provide an attachment which is applicable to a pin.

In the drawings I have shown several different forms of devices for carrying out my invention.

Figure 1 is a fragmentary sectional view of a plate and tooth construction embodying my invention.

Fig. 2 shows in perspective a single tooth with the projecting pins and anchorage tube of my invention.

Fig. 3 is a horizontal section and plan view showing the tube anchorage assembled with a tooth.

Fig. 4 is a perspective view of another form of anchorage device.

Fig. 5 is a perspective view of an anchorage loop.

Figs. 6 and 7 are perspective views of two other forms of anchorage tubes.

Fig. 8 is a perspective view showing an anchorage tube in two parts adjustable with relation to each other.

Fig. 9 is a vertical projection of another form of two part tube.

Fig. 10 is a perspective view of another form of anchorage device, two parts of which are adjustable with relation to each other.

Fig. 11 is a perspective view of an anchorage device for a single pin.

Fig. 12 is a plan view of another form of anchorage device.

Fig. 13 is a perspective view of another form of anchorage tube.

15 indicates one form of tooth having headed pins 16—16 projecting therefrom. Such teeth frequently have shoulders such as 17, but this is not necessary to the carrying out of my invention. The plate 18 is formed of a suitable composition such as rubber adapted to be vulcanized in the usual manner. It should be understood that in using the term plate, I do not intend to be limited to any particular form of plate, or to its use with any particular number of teeth, but I have used the term plate in the broad sense of a molded and vulcanized composition bearing one or more artificial teeth.

One form of anchorage device consists of a metallic tube 19 slit along one edge so as to enable it to grip behind the heads of the pins 16. This tube may be beveled on the ends as at 20, and it may also be provided with one or more recesses, projections, or perforations 21'. This anchorage tube is simply slipped on to the pin 16—16 just before or at the time the teeth are being placed in the mold ready for vulcanizing. The rubber compound flows into the tube and around the shanks and heads of the pins, and securely holds the tooth, pins, and tube in position on the plate.

If desired, the tube may be provided with notches or recesses such as 22 for the shanks of the pins so as to more effectually grip beneath the heads of the pins. To facilitate the placing of the tube upon the pins, an inclined entrance 23 may be provided at one end of the tube so that the shanks of the pins may be guided in place.

The form of tube 24 shown in Fig. 4 is substantially triangular in cross-section and may be provided with an extension such as 25 to receive an additional anchorage wire 26. It will be noted that the slot 27 for the pins is closed at one end and open at the other. The closed end affords a bearing beneath the side of one pin. A lug 28 may be provided adapted to be bent up for closing the end of the tube more or less and serving to prevent the tube from being removed from the pins.

The ends of the wire loop may be notched as at 29 in Fig. 5 and adapted to engage the pins. Such a loop may be used with the cylindrical tube of Fig. 1 if desired, and is particularly desirable with the forms of Figs. 6 and 7.

The tube 30 of Fig. 6 may be provided with backwardly turned flanges 31 which may be compressed to open up the tube 30 and facilitate handling and attachment.

In the form shown in Fig. 7, the tube 31' is provided with flaring flanges 32 which serve to increase the anchorage effect in the rubber composition.

In the form shown in Fig. 8, the tube is shown in two parts 33 and 34, adapted to be telescopically applied to each other. These two parts have slots 35 and 36 for the pins. To assemble the device, the part 33 is slipped on to the pins from one edge of the tooth until one end of the slot 35 engages one of the pins. The other part 34 is then slipped on to the tube 33 from the opposite direction until the end of the slot 36 engages the other pin. Thus each pin is engaged around substantially half of the circumference of its shank and head. This form of tube may be provided with flanges 37 for increasing the anchorage effect.

In the form shown in Fig. 9, the two parts 38 and 39 are adapted to be telescoped, and each part is provided with a slot adapted to receive both pins. To attach this device, the two parts 38 and 39 are assembled one within the other until the broader portions 40 and 41 register. They are then applied to the pins and the two parts then pushed together until the narrow slot 42 engages the shank of one pin and the narrow slot 43 engages the other pin.

In the form shown in Fig. 10, the tube is in two parts 44 and 44', which have shanks connected by the corrugated portion 45. The slots 46—46 are adapted to receive the pin heads, and the narrower portions 47—47 are adapted to receive the shanks of the pins when the tubes are turned. By bending the corrugated portion 45 more or less in one direction or the other, the spacing of the slots 46 from each other may be varied so as to accommodate different spacings of pins.

The form of anchorage tube 48 shown in Fig. 11 has but a single slot 49 for one pin. Obviously, one of these devices may be provided for each pin irrespective of the spacing of the pins.

In the form shown in Fig. 12 the anchorage tube is secured to a clip 54 which in turn carries the tooth.

In the form shown in Fig. 13, the tube 57 is provided with but a single recess 58. Another recess as indicated at 59 by dotted lines may be cut at the proper place to correspond with the spacing of the pins on the particular tooth to be used. This tube may be provided with an offset 60 to increase the anchorage effect. Obviously, any of the forms of tubes may be provided with openings, projections, or recesses for increasing the anchorage.

I claim:—

1. The combination of a composition plate, an artificial tooth having pins and an anchorage tube embracing said pins, said pins and said tubes being embedded in the composition.

2. The combination of an artificial tooth, anchorage pins projecting therefrom, an anchorage tube connected with said pins, an anchorage loop projecting from said tube, and a composition vulcanized to said loop, tooth, tube, and pins.

3. In a vulcanized plate construction, the combination of a tooth, a tubular anchorage device extending transversely of said tooth, and means for securing said device to said tooth, the composition of the vulcanized plate extending into and embedding said tubular anchorage device.

4. In a vulcanized plate construction, the combination of a tooth, pins projecting from the rear face thereof, a hollow clamping device mounted on said pins and extending transversely of said tooth, the composition of the plate filling and embracing said device and anchoring said tooth and pins in place.

5. The combination of an artificial tooth, two headed pins projecting therefrom, a split tube having a notched portion embracing one of said pins, and another portion embracing the other pin, and a plate vulcanized to said tooth, pins, and tube.

6. As an article of manufacture, a slotted anchorage tube adapted to be slipped over the heads of pins attached to a tooth and adapted to be embedded in a vulcanized plate to lock the pins in the plate.

7. The combination of an artificial tooth, pins projecting therefrom, an anchorage device mounted on said pins and having means for preventing movement longitudinally of the tooth, and a vulcanized plate embracing said device and holding it in fixed relation relative to said pins and said tooth.

8. An anchorage device for an artificial tooth and vulcanized plate comprising an open ended tube and a loop adjustably connected thereto and adapted to be embedded in the plate.

9. An anchorage device for an artificial tooth and vulcanized plate comprising a tube having openings for the plate composition and having means enabling it to be secured horizontally to a tooth and embedded in the plate.

RALPH V. BLAKE.